US012616861B2

(12) United States Patent
Campbell

(10) Patent No.: US 12,616,861 B2
(45) **Date of Patent: *May 5, 2026**

(54) HEAT SENSITIVE PROTECTIVE BARRIER AND A METHOD FOR ITS USE

(71) Applicant: David Landis Campbell, Harleysville, PA (US)

(72) Inventor: David Landis Campbell, Harleysville, PA (US)

(*) Notice: Subject to any disclaimer, the term of this patent is extended or adjusted under 35 U.S.C. 154(b) by 230 days.

This patent is subject to a terminal disclaimer.

(21) Appl. No.: 18/349,946

(22) Filed: Jul. 10, 2023

(65) Prior Publication Data

US 2024/0084585 A1 Mar. 14, 2024

Related U.S. Application Data

(63) Continuation of application No. 15/413,353, filed on Jan. 23, 2017, now Pat. No. 11,697,937, which is a continuation of application No. 13/965,137, filed on Aug. 12, 2013, now Pat. No. 9,550,083, which is a (Continued)

(51) Int. Cl.

| | |
|---|---|
| ***E04B 1/66*** | (2006.01) |
| ***A62C 35/68*** | (2006.01) |
| ***A62C 99/00*** | (2010.01) |
| ***E04B 1/94*** | (2006.01) |
| ***E04B 9/30*** | (2006.01) |
| ***E04G 21/30*** | (2006.01) |

(52) U.S. Cl.

CPC ............ *A62C 99/009* (2013.01); *A62C 35/68* (2013.01); *E04B 1/66* (2013.01); *E04B 1/941* (2013.01); *E04B 9/303* (2013.01); *E04G 21/30* (2013.01); *Y10T 428/192* (2015.01)

(58) Field of Classification Search

CPC ... E04B 1/66; E04B 1/94; E04B 1/941; E04G 21/30; A62C 99/009

USPC .................................................. 52/3, 5, 232

See application file for complete search history.

(56) References Cited

U.S. PATENT DOCUMENTS

| | | | |
|---|---|---|---|
| 3,399,927 | A | 9/1968 | Groetschel |
| 3,632,039 | A | 1/1972 | Gayle |
| 3,652,371 | A | 3/1972 | Hirata |

(Continued)

FOREIGN PATENT DOCUMENTS

| | | | |
|---|---|---|---|
| DE | 19859550 | A1 | 6/2000 |
| JP | 58060013 | A | 4/1983 |
| JP | 1990200277 | A | 8/1990 |

*Primary Examiner* — Paola Agudelo

(74) *Attorney, Agent, or Firm* — Howard IP Law Group, PC

(57) ABSTRACT

A protective barrier that will typically be installed beneath ceilings during construction work being performed on ceilings or roofs of buildings. The protective barrier can be comprised entirely of one material or of different materials connected by seams. Some or all of these materials can be designed to fail when contacted by water via dissolution, melting or through some other destructive process initiated by contact with water. Some or all of the materials comprising the protective barrier can be designed to fail at a certain temperature. This failure can create access points from the ceiling through the protective barrier to the area being protected by the barrier, which can allow water from a fire suppression system to reach a fire located below the protective barrier.

17 Claims, 11 Drawing Sheets

Related U.S. Application Data continuation of application No. 12/616,817, filed on Nov. 12, 2009, now Pat. No. 8,505,252.

(60) Provisional application No. 61/769,659, filed on Feb. 26, 2013, provisional application No. 61/243,866, filed on Sep. 18, 2009.

(56) References Cited

U.S. PATENT DOCUMENTS

| | | | | | |
|---|---|---|---|---|---|
| 3,762,454 | A | | 10/1973 | Wilkins | |
| 4,003,208 | A | | 1/1977 | Hornung et al. | |
| 4,416,713 | A | * | 11/1983 | Brooks ............. | B29C 66/91655 156/304.6 |
| 4,637,944 | A | | 1/1987 | Walker | |
| 4,854,419 | A | | 8/1989 | Lyras et al. | |
| 4,932,155 | A | * | 6/1990 | Friemel .................. | A01N 25/18 428/34.3 |
| 5,032,447 | A | * | 7/1991 | Bailey ..................... | E04B 1/948 428/184 |
| 5,096,335 | A | | 3/1992 | Anderson et al. | |
| 5,110,641 | A | * | 5/1992 | Kean ...................... | B65D 77/10 383/92 |
| 5,173,344 | A | | 12/1992 | Hughes | |
| 5,244,731 | A | * | 9/1993 | Saito ....................... | D01F 6/625 424/404 |
| 5,464,286 | A | | 11/1995 | Stevens et al. | |
| 6,572,948 | B1 | * | 6/2003 | Dykhoff .................. | E04B 1/948 428/920 |
| 8,505,252 | B2 | * | 8/2013 | Campbell ............... | E04B 9/303 428/58 |
| 8,535,461 | B1 | | 9/2013 | Godbehere | |
| 9,550,083 | B2 | * | 1/2017 | Campbell ............... | E04G 21/30 |
| 10,538,928 | B2 | * | 1/2020 | Campbell, Sr. ....... | E04G 21/243 |
| 11,697,937 | B2 | * | 7/2023 | Campbell ............... | E04B 1/941 52/232 |
| 2008/0044614 | A1 | * | 2/2008 | Hannon .............. | B29C 65/7435 428/57 |
| 2013/0327549 | A1 | * | 12/2013 | Campbell ............ | A62C 99/009 169/45 |
| 2017/0333739 | A1 | * | 11/2017 | Campbell ............... | E04B 9/303 |
| 2017/0356201 | A1 | * | 12/2017 | Campbell ............... | E04G 21/30 |
| 2020/0101333 | A1 | * | 4/2020 | Campbell ............... | E04B 9/303 |
| 2021/0172164 | A1 | * | 6/2021 | Holm .................. | E05B 63/0065 |

* cited by examiner

HEAT SENSITIVE PROTECTIVE BARRIER AND A METHOD FOR ITS USE

CROSS REFERENCE TO RELATED APPLICATIONS

This application is a continuation of application Ser. No. 15/413,353 filed on Jan. 23, 2017, which is a continuation of application Ser. No. 13/965,137 filed Aug. 12, 2013, which is a continuation-in-part of U.S. nonprovisional patent application Ser. No. 12/616,817 filed Nov. 12, 2009, which is incorporated by reference herein in its entirety, which claims benefit to U.S. provisional application No. 61/243,866 filed Sep. 18, 2009, which is also incorporated by reference herein in its entirety. This application also claims the benefit of U.S. provisional patent application No. 61/769,659 filed Feb. 26, 2013, which is incorporated by reference herein in its entirety.

FIELD OF THE INVENTION

The present device relates to protective barriers that are typically installed beneath ceilings during construction work being performed on ceilings or roofs buildings. A protective barrier can comprise sections connected by scams. These scams or the entire protective barrier can be designed to fail when contacted by water, either by dissolution, melting or by some other destructive process. Failure of one or more of the seams can create access points from the ceiling through the protective barrier to the area being protected by the barrier.

BACKGROUND

Protective barriers, such as those described herein, prevent dust and debris from falling on floors, on people, or on equipment located below a ceiling or roof being repaired or constructed. In this way, the protective barrier protects from added costs from damage or injury resulting from this falling material and allows work to continue below the ceiling or roof. Such barriers are commonly constructed from polyethylene sheets or similar materials, which have proven to be durable, easy to work with, and inexpensive. However, a problem can arise with this type or protective barrier when it is installed below a fire suppression sprinkler system, which is often required in order to meet performance expectations. Such an installation can impair the flow of water from the fire suppression sprinkler system to a fire located beneath the protective barrier.

What is needed is a protective barrier that can perform its primary function of protecting people and property from falling dust and debris, but also has the capacity to allow water from a fire suppression sprinkler system to gain access to a fire located below the barrier.

SUMMARY OF THE INVENTION

It is an aspect of the present device to provide a protective barrier which can protect people and property from falling dust and debris, but also has the capacity to allow water from a fire suppression sprinkler system to gain access to a fire located below the barrier.

The above aspects can be obtained by a protective barrier, comprising: at least two sections of waterproof material; and a plurality of seams comprising a temperature sensitive material attaching the at least two sections of waterproof material.

The above aspects can also be obtained by a protective barrier that comprises at least two sections of waterproof material and a plurality of seams comprising a material that reacts exothermically with water, the seams attaching the at least two sections of waterproof material.

The above aspects can also be obtained by a method that comprises providing a planar sheet comprising a material that is either water soluble or reacts exothermically with water; and elevating the planar sheet above a floor and under a sprinkler system, wherein the planar sheet prevents dust or debris from reaching the floor.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which.

DETAILED DESCRIPTION

Figure 1:
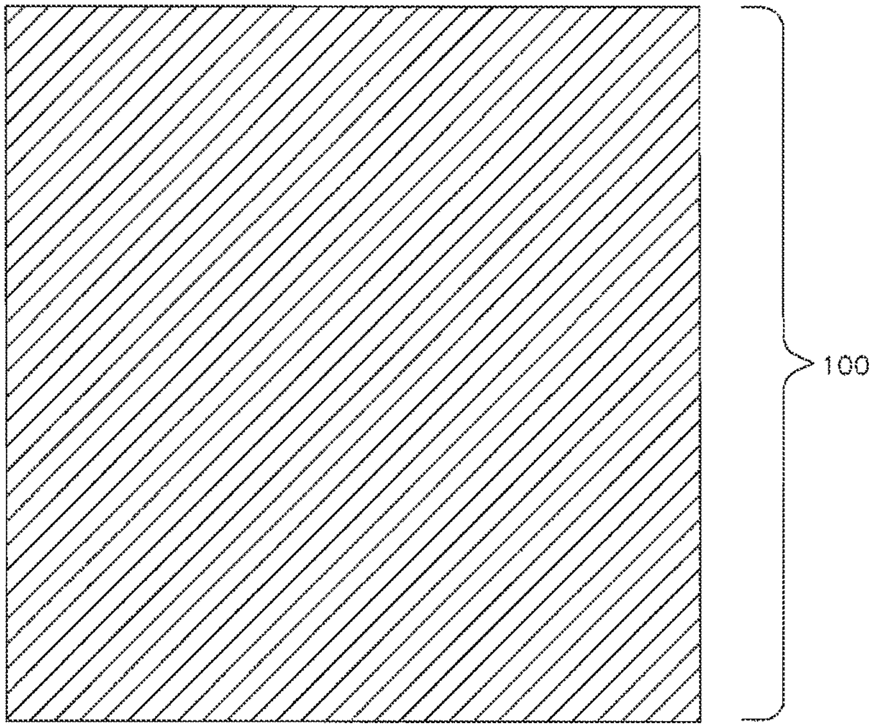
FIG. 1 is a schematic drawing of a protective barrier comprised of a water soluble material or a material that reacts exothermically with water according to an embodiment.

This description of the exemplary embodiments is intended to be read in connection with the accompanying drawings, which are to be considered part of the entire written description. In the description, relative terms such as "lower." "upper," "horizontal," "vertical,", "above," "below," "up," "down," "top" and "bottom" as well as derivative thereof (e.g., "horizontally," "downwardly," "upwardly." etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Reference will now be made in detail to the presently preferred embodiments of the invention, examples of which are illustrated in the accompanying drawings, wherein like reference numerals refer to like elements throughout.

FIG. 1 is a schematic drawing of a protective barrier 100 comprised of a water soluble material or a material that reacts exothermically with water according to an embodiment.

A protective barrier 100 can be comprised entirely of a water soluble polymer, which can prevent dust and debris from reaching a protected area when dry. This protective barrier can dissolve in full or in part when contacted by water allowing water from a fire suppression sprinkler system 101 to reach a fire 102 located below the protective barrier 100. The protective barrier 100 can be comprised of a polymer comprising polyvinyl alcohol or any other suitable water soluble material known to one of ordinary skill in the art.

A protective barrier 100 can also be comprised entirely of materials that react exothermically with water, which can prevent dust and debris from reaching a protected area when dry. This exothermic reaction can cause the protective barrier to melt in full or in part when contacted by water allowing water from a fire suppression sprinkler system 101 to reach a fire 102 located below the protective barrier 100. The protective barrier 100 can be comprised of a polymer or similar material further comprising magnesium metal or any other suitable material that react exothermically with water, that is known to one of ordinary skill in the art.

Figure 2:
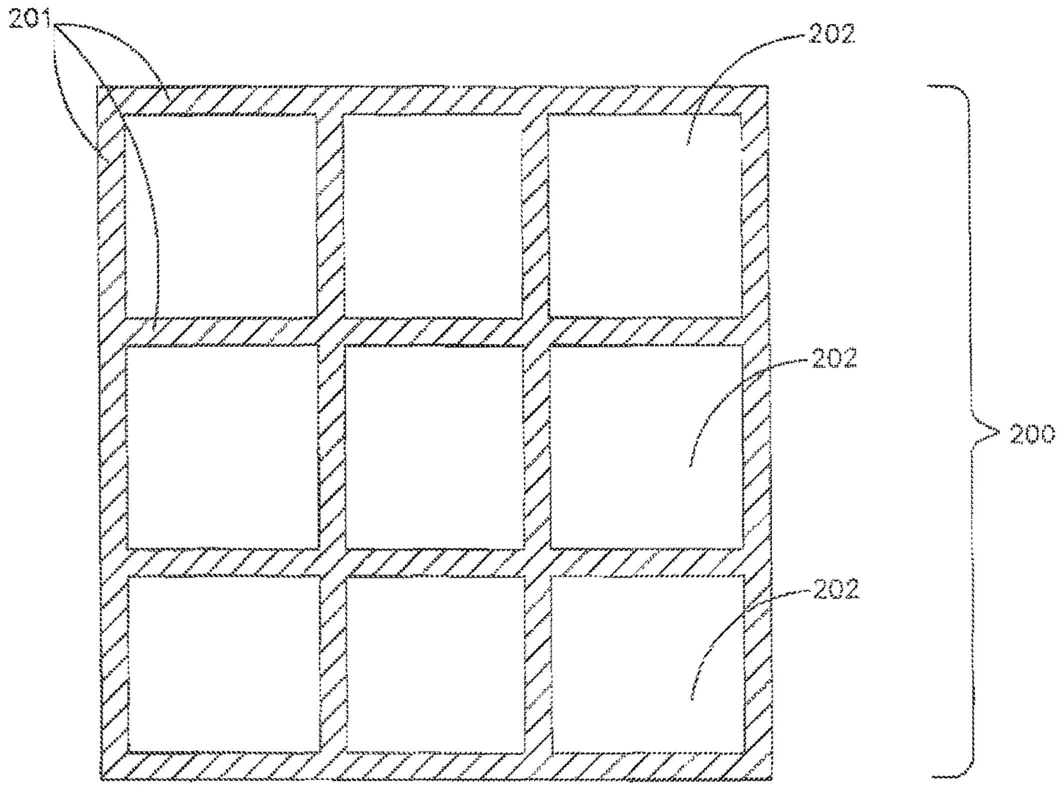
FIG. 2 is a schematic drawing of a protective barrier comprising water soluble seams, according to an embodiment.

FIG. 2 is a schematic drawing of a protective barrier 200 comprising water soluble seams 201, according to an embodiment.

A protective barrier 200 comprising water soluble seams 201 can be comprised of sections 202 of standard, waterproof or water resistant material, such as polyethylene, vinyl or some other suitable material known to those with ordinary skill in the art of protective barriers. These sections 202 can be connected by seams 201 made from water soluble materials. Such seams 201 can comprise strips of water soluble materials which can be connected to the edges of the sections 202. These strips of water soluble material can be connected to the sections 202 by stitching, adhesives, glues, rivets, staples, or any other similar devices known to those with ordinary skill in the art (not pictured). Furthermore, the seams 201 can be totally comprised of water soluble stitchings, adhesives, glues, or similar connecting devices which are known to those of ordinary skill in the art (not pictured). Seams 201, comprising these water soluble materials, can dissolve upon contact with water allowing the sections 202 to fall to the floor or for openings to form between the sections 202 allowing water to pass by or through the protective barrier 200. In this way, the protective barrier 200 could allow water from a fire suppression system (not pictured) to reach a fire located below the barrier 200.

Figure 3:
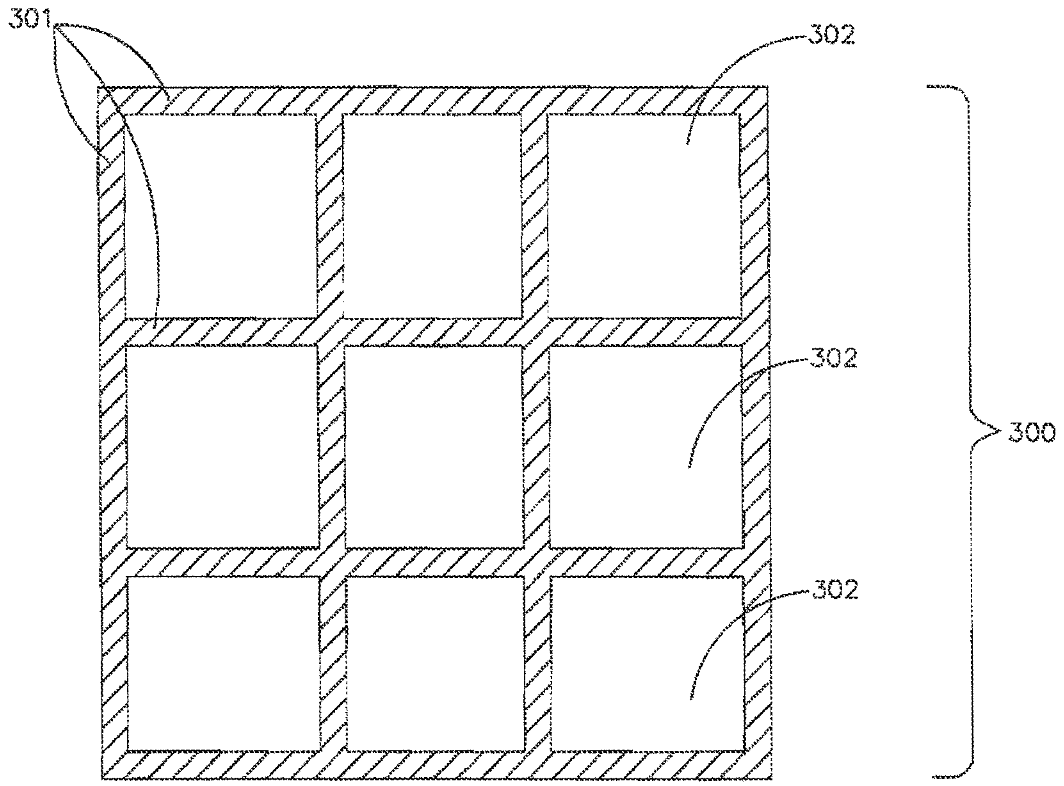
FIG. 3 is a schematic drawing of a protective barrier comprising seams, which further comprise a material that can react exothermically with water, according to an embodiment.

FIG. 3 is a schematic drawing of a protective barrier 300 comprising seams 301 that comprise a material that can react exothermically with water, according to an embodiment.

A protective barrier 300 comprising exothermically reactive seams 301 can be comprised of sections 302 of standard, waterproof or water resistant material, such as polyethylene, vinyl or other suitable material known to those of ordinary skill in the art of protective barriers. These sections 302 can be connected by exothermically reactive seams 301 made from materials, or treated with chemicals that react exothermically with water to create heat sufficient to melt the exothermically reactive seams 301. This reactive material can be magnesium metal or any other material known to sufficiently react exothermically with water so that the heat reactive seams 301, comprising these heat reactive materials, can melt or otherwise disintegrate the exothermically reactive seams 301 comprising the protective barrier 300. This melting or disintegration can allow the sections 302 of the protective barrier to either fall to the floor or for openings to form between the sections 302 allowing water from a fire suppression sprinkler (not shown in FIG. 3) to pass by or through it 300.

The material(s) used for the seams in any of the embodiments described herein can cost more than the waterproof or water resistant material used in the sections. Thus, by combining the seams and sections as described herein, a more cost effective barrier can be produced. Furthermore, in addition to the square checkerboard pattern illustrated in FIGS. 2-3, the sections and seams can be formed and connected using other shapes as well, such as triangles, diamonds, polygons, curves, arbitrary shapes, etc.

Figure 4:
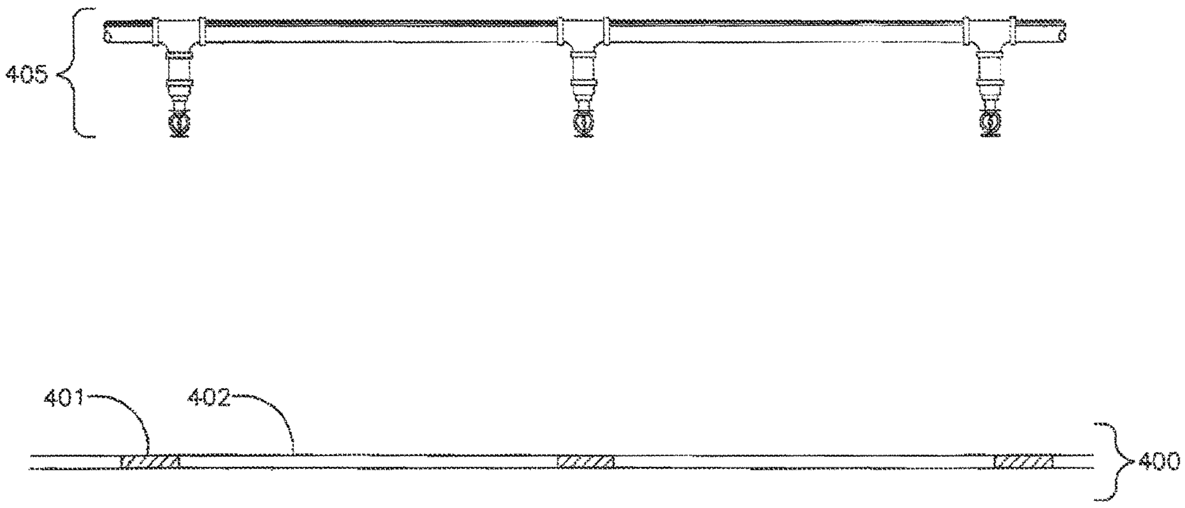
FIG. 4 is a perspective drawing of a protective barrier installed beneath a fire suppression system, according to an embodiment.

FIG. 4 is a perspective drawing of a protective barrier 400 installed beneath a fire suppression system.

The protective barrier 400 is located below a fire suppression system 405. The protective barrier 400 can comprise sections 402 of standard, waterproof or water resistant material, such as polyethylene, vinyl or other similar material known to those with ordinary skill in the art of protective barriers. These sections 402 can be connected by seams 401 made from water soluble materials, or materials that react exothermically with water and melt when contacted with water, heat sensitive materials or any other material that will cause the sections 402 to separate when exposed to water or fire. When dry, this protective barrier 400 can prevent dust and debris from reaching the protected area located beneath it.

Figure 5:
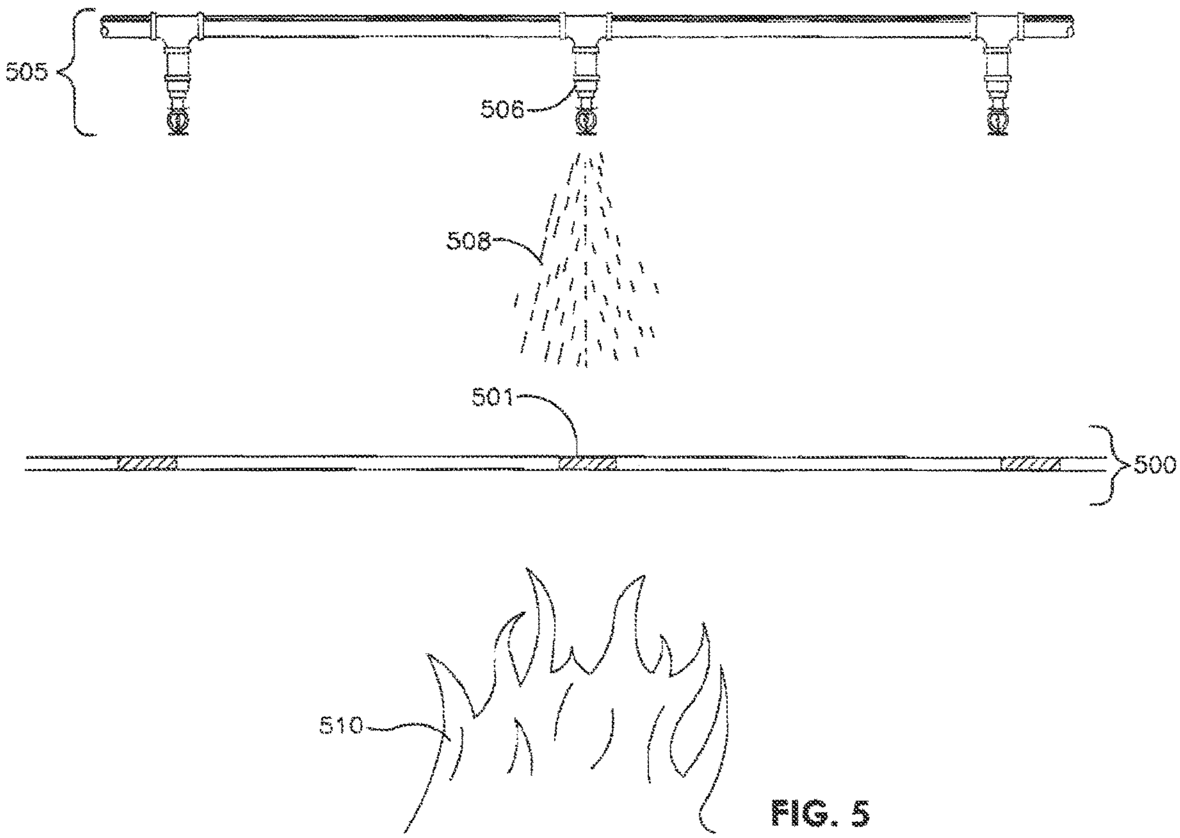
FIG. 5 is a perspective drawing of a protective barrier installed beneath a fire suppression system, wherein a fire is located beneath the protective barrier and a sprinkler above the fire and protective barrier has been activated thereby releasing water, according to an embodiment.

FIG. 5 is a perspective drawing of a protective barrier 500 installed beneath a fire suppression system 505, wherein a fire 510 is located beneath the protective barrier 500 and a sprinkler 506 above the fire 510 and protective barrier 500 has been activated thereby releasing water 508.

Water 508 released by the sprinkler 506, which is part of the fire suppression system 505, contacts one or more seams 501 attaching sections of the protective barrier 500. This water 508 can dissolve seams 501 comprising water soluble materials, reducing their tensile strength and causing them to fail, according to an embodiment.

In an alternative embodiment, the entire protective barrier can be comprised of one or more water soluble materials. Water contacting any part of this protective barrier would cause the contacted part to dissolve resulting in openings in the protective barrier.

In another alternative embodiment, water 508 released by the sprinkler 506, can contact one or more seams 501 comprising the protective barrier 500. This water 508 can react exothermically with the seams 501 which can be made from materials such as magnesium metal, which react with water to create heat. This heat can cause the seams to melt or to sufficiently reduce their tensile strength to cause them to fail.

In another alternative embodiment, the entire protective barrier 500 can be comprised of materials that react exothermically with water. Water 508 contacting any part of this protective barrier 500 can cause the contacted part to melt or disintegrate resulting in openings in the protective barrier 500.

Figure 6:
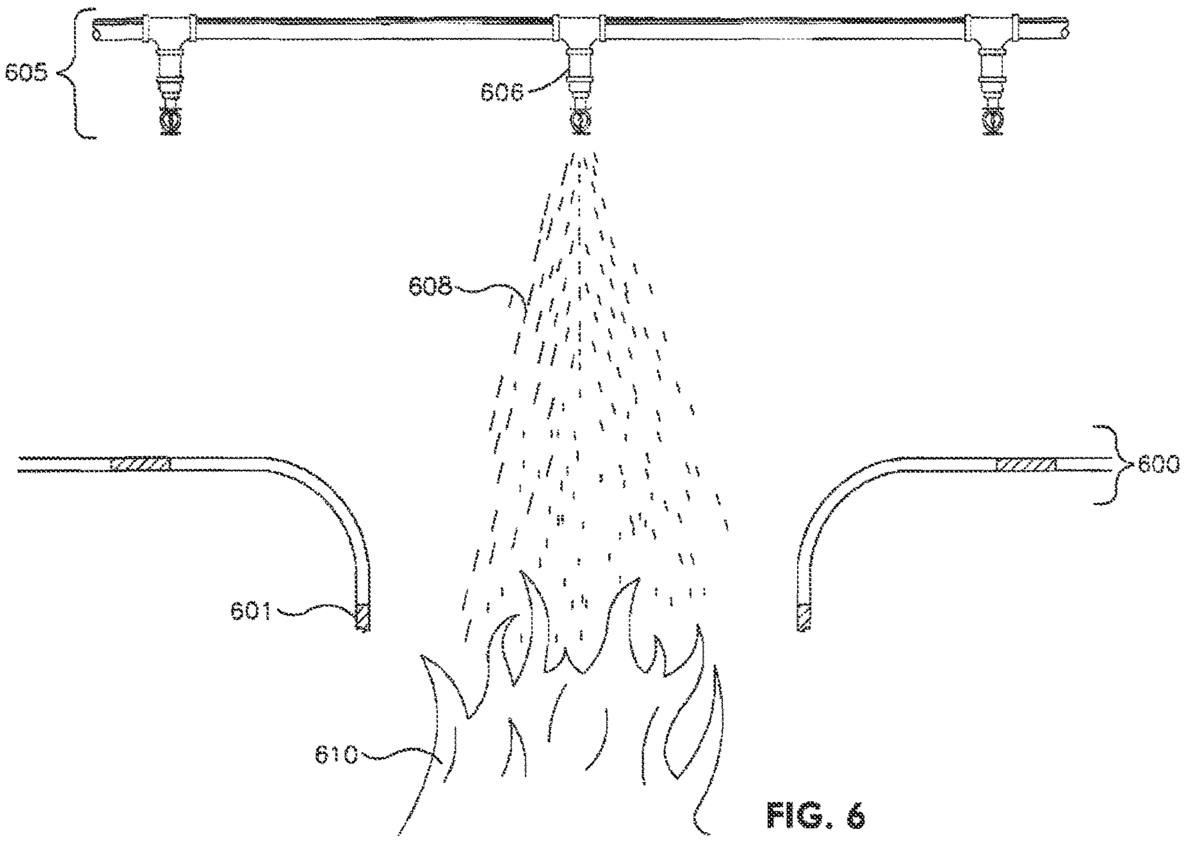
FIG. 6 is a perspective drawing of a protective barrier installed beneath a fire suppression system, wherein a seam has failed due to contact with water and/or elevated temperatures, creating an opening in the protective barrier and allowing water from a sprinkler to reach a fire, according to an embodiment.

FIG. 6 is a perspective drawing of a protective barrier 600 installed beneath a fire suppression system 605, wherein a seam 601 has failed due to contact with water 608, creating an opening in the protective barrier 600 allowing water 608 from a sprinkler 606 to reach a fire 610, according to an embodiment.

Figure 7:
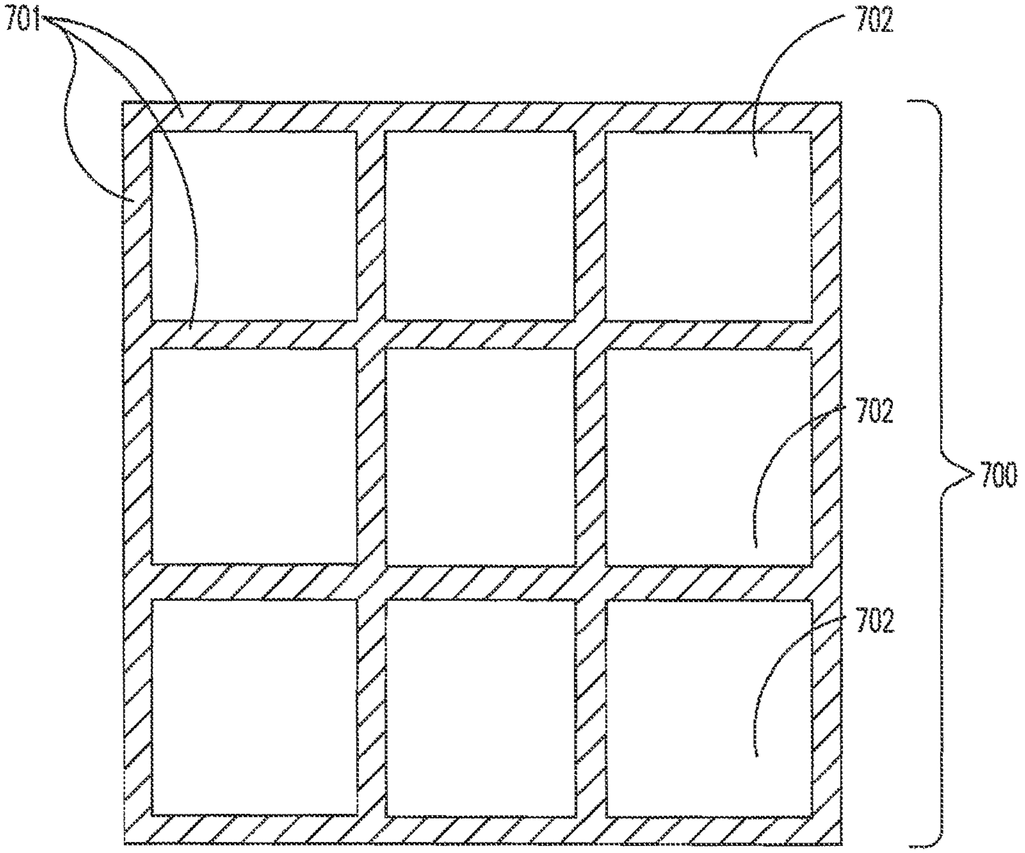
FIG. 7 is a schematic drawing of a protective barrier comprising temperature sensitive seams, according to an embodiment.

FIG. 7 is a schematic drawing of a protective barrier 700 comprising temperature sensitive seams 701, according to an embodiment.

A protective barrier 700 comprising temperature sensitive seams 701 can be comprised of sections 702 of standard, waterproof or water resistant material, such as polyethylene, vinyl or other suitable material known to those of ordinary skill in the art of protective barriers. These sections 702 can be connected by temperature sensitive seams 701 made from materials that can allow the temperature sensitive seams 701 to fail at a temperature lower than the temperature set to activate the sprinkler (not shown). In an embodiment, this heat-reactive material can be thread comprising copolyamide, which is marketed under the trade name GRILON LT, or polycaprolacton, which is marketed under the trade name GRILON VLT1, or any other material known to be sufficiently heat sensitive so that the temperature sensitive seams 701, comprising these temperature reactive materials, can melt, open up, fall apart or otherwise disintegrate when the temperature sensitive seams 701, comprising the protective barrier 700 are heated to a certain temperature. This melting or disintegration can allow the sections 702 of the protective barrier 700 to either fall to the floor or for openings to form between the sections 702 allowing water from a fire suppression sprinkler to pass by or through the protective barrier 700.

In an embodiment, the temperature sensitive seams 701 can comprise a combination of water soluble seams and temperature sensitive seams where the water soluble seams can dissolve upon contact with water and the temperature sensitive seams can open up or disintegrate upon contact with a certain temperature lower than the temperature set to activate the fire suppression sprinkler. In an embodiment, the temperature sensitive seams can be integrated into the water soluble seams. The integrated temperature sensitive seams can open up when it contacts a certain temperature lower than the temperature set to activate the sprinkler. The water soluble seams can dissolve upon contact with water. The opening up of the temperature sensitive seams and the dissolving of the water soluble seams can allow the sections 702 of the protective barrier 700 to either fall to the floor to for openings to form between the sections 702 allowing water from a sprinkler to pass by or through the protective barrier 700. In an embodiment, the water soluble seams can comprise one or more slits or holes and the slits or holes can be covered with temperature sensitive seams that can comprise a tape or glue or other material that can fall apart or open up at a certain temperature lower than the temperature set to activate the sprinkler.

In an embodiment, the temperature sensitive seams 701 can comprise metal or wire that can be electrically activated in the event of a fire or alarm. Electrical activation can comprise heating the temperature sensitive seams 701 to a certain temperature lower than the temperature set to activate the sprinkler which can allow the temperature sensitive seams 701 to open up or fall apart.

The material(s) used for the temperature sensitive seams 701 in any of the embodiments described herein can cost more than the waterproof or water resistant material used in the sections 702. Thus, by combining the temperature sensitive seams 701 and sections 702 as described herein, a more cost effective barrier can be produced. Furthermore, in addition to the square checkerboard pattern illustrated in FIG. 7, the sections 702 and temperature sensitive seams 701 can be formed and connected using other shapes as well, such as triangles, diamonds, polygons, curves, arbitrary shapes, etc.

Figure 8:
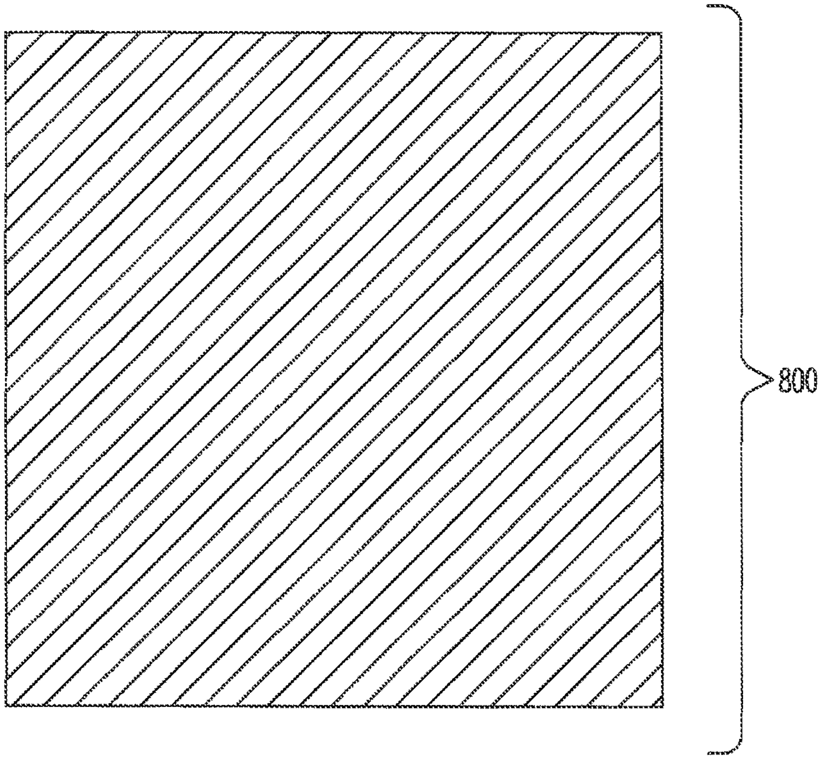
FIG. 8 is a schematic drawing of a protective barrier 800 comprised of a temperature sensitive material that reacts at a certain temperature lower than the temperature set to activate a sprinkler.

FIG. 8 is a schematic drawing of a protective barrier 800 comprised of a temperature sensitive material that reacts at a certain temperature lower than the temperature set to activate the sprinkler.

A protective barrier 800 can be comprised entirely of temperature sensitive material, which can prevent dust and debris from reaching a protected area when heated to a particular temperature. In an embodiment, this temperature can be within a range between 140 degrees and 180 degrees. Openings in this protective barrier 800 can form any part is heated to a certain temperature, which can be lower than the temperature set to activate a fire suppression sprinkler, allowing water from a sprinkler system (not shown) to reach a fire (not shown) located below the protective barrier 800. The protective barrier 800 can be comprised of copolyamide, which is marketed under the trade name GRILON LT, or polycaprolacton, which is marketed under the trade name GRILON VLT 1, or any other material known to be sufficiently heat sensitive so that the temperature reactive materials, can melt, open up, fall apart or otherwise disintegrate when any part of the protective barrier 800 is heated to a certain temperature.

Figure 9:
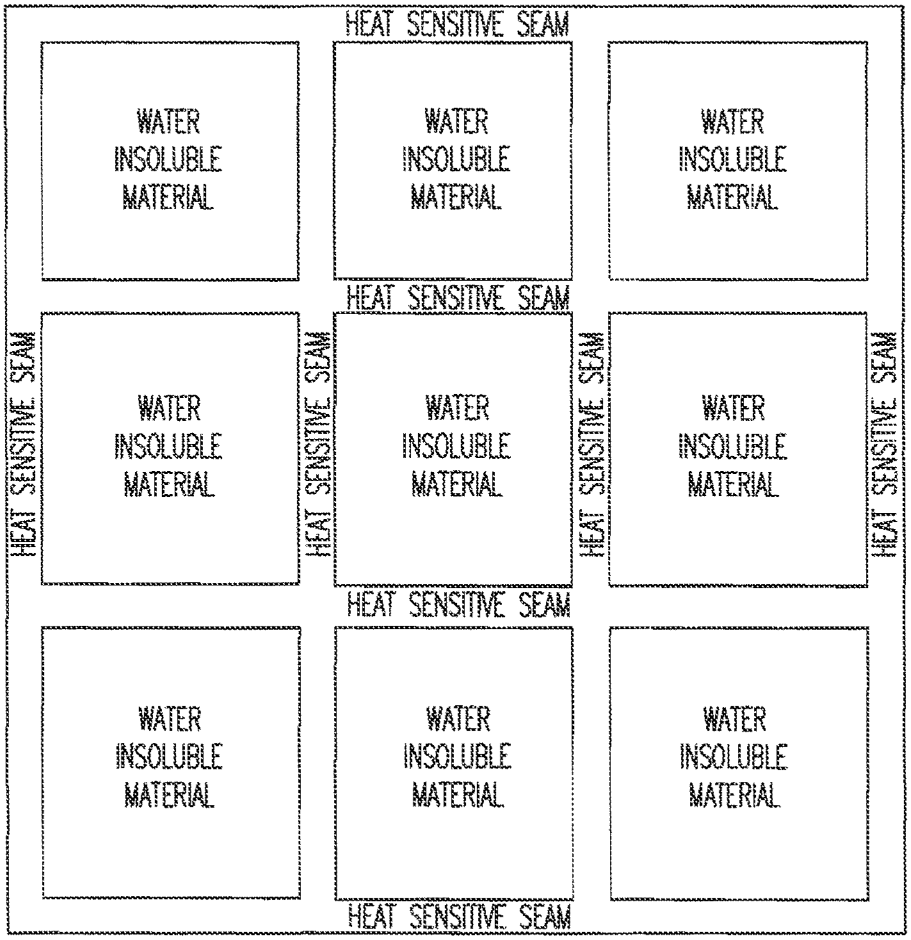
FIG. 9 is a schematic drawing of a protective barrier 900 comprised in part of a temperature sensitive material that reacts at a certain temperature lower than the temperature set to activate the sprinkler and in part of a water-soluble material, according to an embodiment.

FIG. 9 is a schematic drawing of a protective barrier 900 comprised in part of a temperature sensitive material that reacts at a certain temperature lower than the temperature set to activate the sprinkler and in part of a water-soluble material, according to an embodiment.

In an alternative embodiment, wherein the entire protective barrier is made from temperature sensitive materials, holes can be created in the barrier at any place where it is contacted by water.

Figure 10:
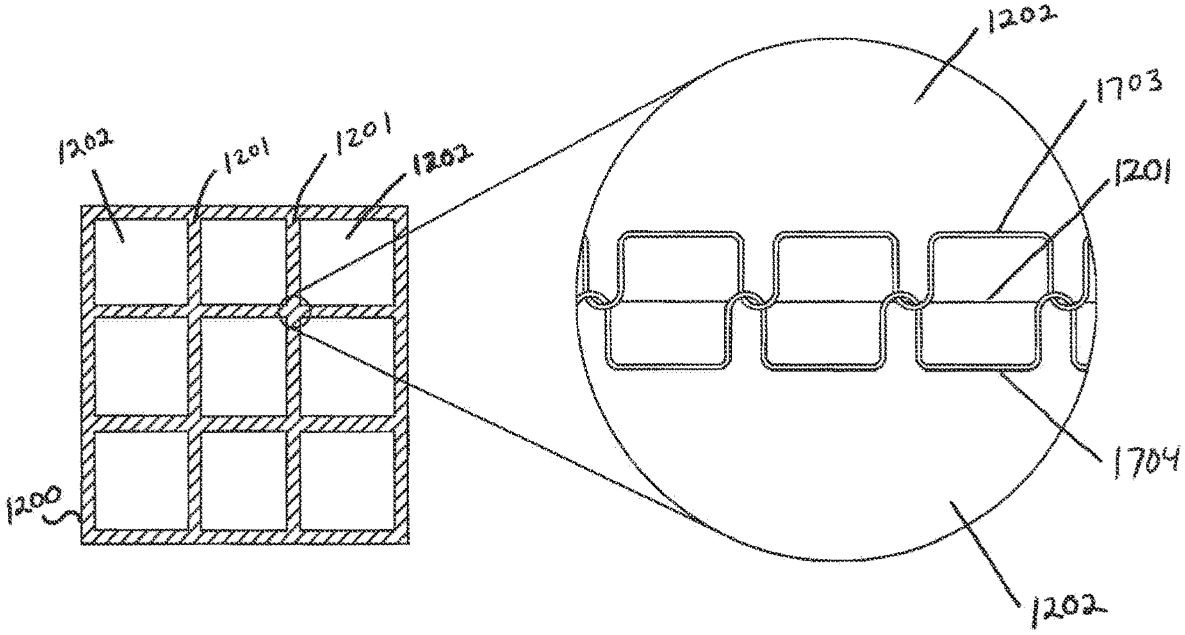
FIG. 10 is a close-up of a heat sensitive seam with threads.

FIG. 10 is a close-up view of a heat sensitive seam 1201, such as those shown in FIG. 2, wherein the seam 1201 can be comprised of one or more heat sensitive threads 1703, which can interlock with heat insensitive threads 1704 to connect sections 1202 of the protective barrier 1200, which do not comprise heat sensitive materials, according to an embodiment. These heat sensitive threads 1703 can be comprised of a copolyamide, a polycaprolacton, or any other suitable heat sensitive material.

In an alternative embodiment, the heat insensitive threads 1704 can be made from a water soluble material such as a polyvinyl alcohol thus creating a seam that can be designed to fail when either subjected to elevated temperatures or contacted by water. The seam depicted in FIG. 7 comprises an interlocking sewing pattern, which is designed to fail if either of the interwoven threads is broken. Therefore, if the seam shown in FIG. 7 comprised a heat sensitive thread 1703 and a water soluble thread 1704, such a seam would fail if it were either heated to a particular temperature or contacted by water.

Figure 11:
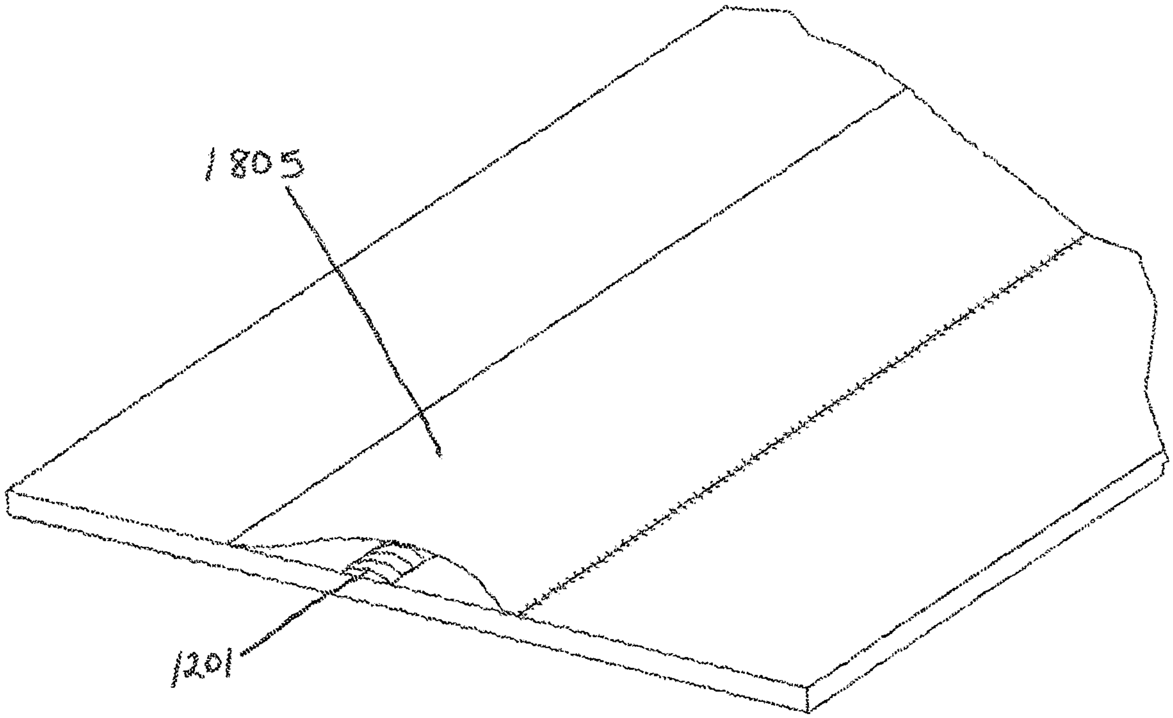
FIG. 11 is a perspective view of a heat sensitive seam with a cap.

FIG. 11 is a perspective top and side view of a heat sensitive seam 1201, such as that shown in FIG. 10, covered by a dust cap 1805 according to an embodiment. In this embodiment, the dust cap 1805 can prevent dust or other material from accessing the seam 1201, which can comprise small holes or other openings that may allow these materials to pass through the protective barrier. In an embodiment, this dust cap 1805 can also be configured to fail when the seam 1201 that it is covering fails.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A protective barrier suspended below a fire suppression sprinkler system for protecting people and property from falling dust and debris, comprising:

at least two planar sections of polyethylene; and a plurality of seams comprising a temperature sensitive material that melts or disintegrates when subjected to temperatures between 140 degrees and 180 degrees Fahrenheit connecting the at least two planar sections of polyethylene to create at least one larger planar section of polyethylene, wherein the connected at least two planar sections exist within the same plane.

2. The protective barrier as recited in claim 1, wherein the temperature sensitive material is a thread comprising copolyamide.

3. The protective barrier as recited in claim 1, wherein the temperature sensitive material is a thread comprising polycaprolactone.

4. The protective barrier as recited in claim 1, wherein the temperature sensitive material is a glue.

5. The protective barrier as recited in claim 1, wherein the seams are located along edges of the planar sections.

6. A protective barrier suspended below a fire suppression sprinkler system for protecting people and property from falling dust and debris, comprising:

at least two planar sections of waterproof or water resistant material; and a plurality of seams comprising a temperature sensitive material that melts or disintegrates when subjected to temperatures between 140 degrees and 180 degrees Fahrenheit connecting the at least two planar sections of waterproof or water resistant material to create at least one larger planar section of waterproof or water resistant material, wherein the connected at least two planar sections exist within the same plane.

7. The protective barrier as recited in claim 6, wherein the temperature sensitive material is a thread comprising copolyamide.

8. The protective barrier as recited in claim 6, wherein the temperature sensitive material is a thread comprising polycaprolactone.

9. The protective barrier as recited in claim 6, wherein the temperature sensitive material is a glue.

10. The protective barrier as recited in claim 6, wherein the seams are located along edges of the planar sections.

11. The protective barrier of claim 6, wherein the waterproof or water resistant material comprises polyethylene or vinyl.

12. A protective barrier suspended below a fire suppression sprinkler system for protecting people and property from falling dust and debris, comprising:

at least two planar sections of waterproof or water resistant material; and a plurality of seams comprising a temperature sensitive material that melts or disintegrates when subjected to temperatures between 140 degrees and 180 degrees Fahrenheit connecting the at least two planar sections of waterproof or water resistant material to create at least one larger planar section of waterproof or water resistant material, wherein the connected at least two planar sections exist within the same plane.

13. The protective barrier as recited in claim 12, wherein the temperature sensitive material is a thread comprising copolyamide.

14. The protective barrier as recited in claim 12, wherein the temperature sensitive material is a thread comprising polycaprolactone.

15. The protective barrier as recited in claim 12, wherein the temperature sensitive material is a glue.

16. The protective barrier as recited in claim 12, wherein the seams are located along edges of the planar sections.

17. The protective barrier of claim 12, wherein the waterproof or water resistant material comprises polyethylene or vinyl.

* * * * *